(12) United States Patent
Choi et al.

(10) Patent No.: US 10,392,458 B2
(45) Date of Patent: Aug. 27, 2019

(54) RESIN BLEND

(71) Applicant: LG CHEM, LTD., Seoul (KR)

(72) Inventors: Eun Joo Choi, Daejeon (KR); Jin Young Ryu, Daejeon (KR); Jong Won Lee, Daejeon (KR); Kyoung Hoon Kim, Daejeon (KR); Hyeon Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 342 days.

(21) Appl. No.: 14/903,263

(22) PCT Filed: Jul. 8, 2014

(86) PCT No.: PCT/KR2014/006088
§ 371 (c)(1),
(2) Date: Jan. 6, 2016

(87) PCT Pub. No.: WO2015/005631
PCT Pub. Date: Jan. 15, 2015

(65) Prior Publication Data
US 2016/0376388 A1    Dec. 29, 2016

(30) Foreign Application Priority Data

Jul. 8, 2013 (KR) .................. 10-2013-0079746
Jul. 8, 2014 (KR) .................. 10-2014-0085017

(51) Int. Cl.
*C08F 220/14* (2006.01)
*B32B 27/30* (2006.01)
(Continued)

(52) U.S. Cl.
CPC ............ *C08F 220/14* (2013.01); *B32B 27/08* (2013.01); *B32B 27/308* (2013.01); *C08L 33/12* (2013.01); *G02B 1/14* (2015.01); *B32B 2551/00* (2013.01)

(58) Field of Classification Search
None
See application file for complete search history.

(56) References Cited

U.S. PATENT DOCUMENTS 4,438,190 A * 3/1984 Ishimaru .............. B23K 35/224
430/281.1
4,446,259 A * 5/1984 Vasta .................. C09D 125/14
523/408
(Continued)

FOREIGN PATENT DOCUMENTS

CN        102272640 A    12/2011
CN        103154151 A     6/2013
(Continued)

*Primary Examiner* — Ronak C Patel
(74) *Attorney, Agent, or Firm* — Dentons US LLP

(57) ABSTRACT

Disclosed are a resin blend, a copolymer, a pellet, a method of manufacturing a resin-molded article using the same, and a resin-molded article. The exemplary resin blend can be useful in providing a protective film for polarizing plates having excellent adhesive strength to a polarizer. Also, the resin blend can be useful in exhibiting excellent adhesive strength to the polarizer without performing an additional primer coating process on a surface(s) of the protective film for polarizing plate, thereby reducing production time and cost and improving productivity.

8 Claims, 1 Drawing Sheet

(51) Int. Cl.
*B32B 27/08* (2006.01)
*C08L 33/12* (2006.01)
*G02B 1/14* (2015.01)

(56) References Cited

U.S. PATENT DOCUMENTS

2007/0282077 A1* 12/2007 Miyamoto ............... C08L 25/14
 525/418
2007/0292804 A1* 12/2007 Uematsu ................ G03F 7/031
 430/286.1
2011/0297896 A1* 12/2011 Kim ...................... C08F 220/18
 252/585
2013/0330558 A1* 12/2013 Yoo ....................... C08L 101/02
 428/407

FOREIGN PATENT DOCUMENTS

| | | |
|---|---|---|
| JP | 2008-050536 A | 3/2008 |
| JP | 2008-88221 A | 4/2008 |
| KR | 10-2008-0114841 A | 12/2008 |
| KR | 10-2010-0081932 A | 7/2010 |
| KR | 10-2010-0104519 A | 9/2010 |
| KR | 10-2011-0131124 A | 12/2011 |
| KR | 10-2012-0038909 A | 4/2012 |
| KR | 10-2012-0038912 A | 4/2012 |
| KR | 10-2012-0040964 A | 4/2012 |
| WO | WO 2012/050400 * | 4/2012 |

* cited by examiner

【FIGURE 1】
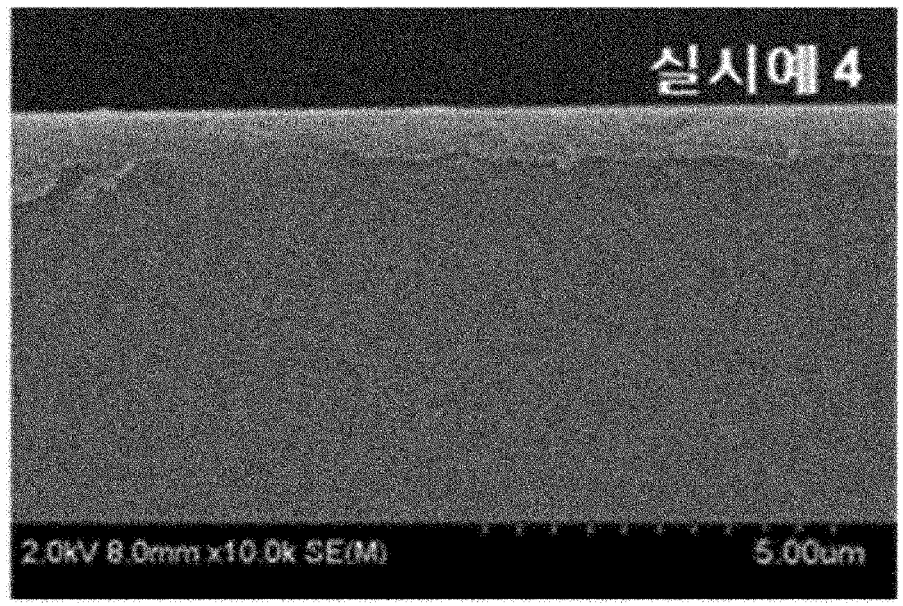
【FIGURE 2】
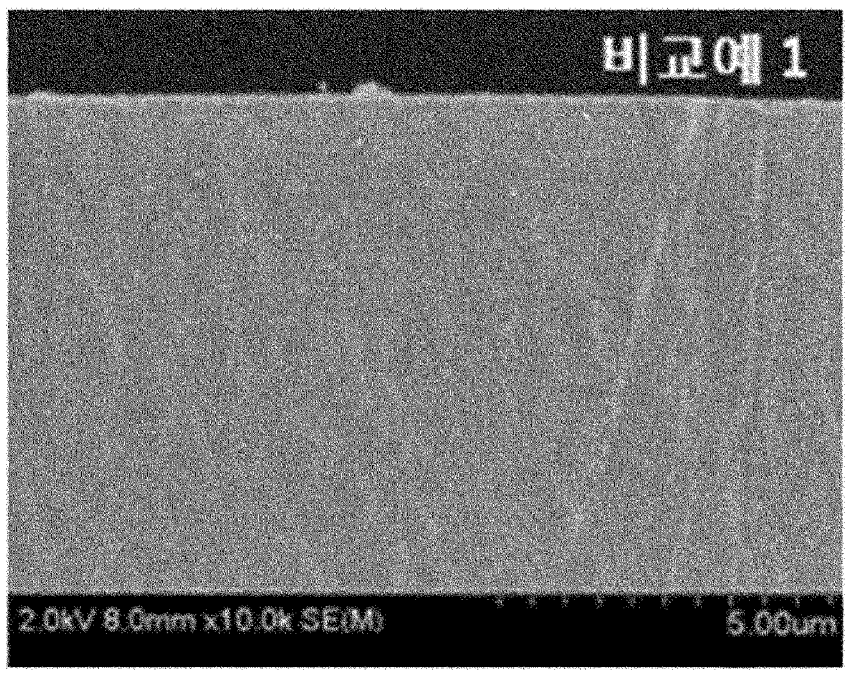

RESIN BLEND

This application is a National Stage Entry of International Application No. PCT/KR2014/006088, filed Jul. 8, 2014, and claims the benefit of and priority to Korean Application No. 10-2013-0079746, filed on Jul. 8, 2013, and Korean Application No. 10-2014-0085017, filed on Jul. 8, 2014, all of which are hereby incorporated by reference in their entirety for all purposes as if fully set forth herein.

TECHNICAL FIELD

The present application relates to a resin blend, a copolymer, a pellet, a method of manufacturing a resin-molded article using the same, and a resin-molded article.

BACKGROUND ART

A polarizing plate is, for example, an optically functional film that is applied to devices such as liquid crystal display devices (LCDs), etc.

The polarizing plate includes a polarizer that is a functional sheet which can extract light that oscillates in one direction from incident light that oscillates in all directions, and may also include triacetyl cellulose (TAC)-based protective films which are generally attached to both surfaces of the polarizer by means of an adhesive or pressure-sensitive adhesive.

However, a typical TAC-based protective film has problems in that it is expensive, and difficult to manufacture. Therefore, an acrylic protective film, and the like have been used as the protective film to replace the TAC-based protective film. Also, since the TAC-based protective film has moisture absorbency, a water-based adhesive such as a polyvinyl alcohol adhesive may be used as the TAC-based protective film. Owing to low moisture absorbency, however, the acrylic protective film is generally attached to the polarizer using a UV-curable adhesive instead of the water-based adhesive. In this case, however, the acrylic protective film shows poor adhesive strength to the polarizer, and thus primer coating is performed on one surface or both surfaces of the acrylic protective film so as to solve the problems.

DISCLOSURE

Technical Problem

The present application is directed to providing a resin blend, and a pellet

Technical Solution

One aspect of the present application provides a resin blend including a first resin, and a second resin that is an acrylic polymer having a difference in surface energy or melt viscosity from the first resin. Here, the second resin is a polymer of a monomer blend including 47 to 73 parts by weight of an alkyl (meth)acrylate containing an alkyl group having 1 to 14 carbon atoms, 20 to 30 parts by weight of a monomer represented by the following Formula 1, and 3 to 27 parts by weight of a monomer represented by the following Formula 2:

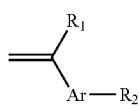

[Formula 1]

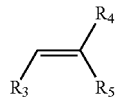

[Formula 2]

In Formulas 1 and 2, $R_1$ and $R_4$ each independently represent hydrogen, or an alkyl group having 1 to 4 carbon atoms, Ar represents a phenyl group, $R_2$ represents hydrogen, or —X—$R_6$, where —X— represents —O—, or —OC(O)—, and $R_6$ represents an alkyl group having 1 to 4 carbon atoms, $R_3$ represents hydrogen, or is joined together with $R_5$ to form a heterocyclic ring, and $R_5$ represents a heterocyclic ring, —COO$R_7$, or —CON$R_8R_9$, where $R_7$ represents hydrogen, an alkyl group having 1 to 4 carbon atoms substituted with a hydroxyl group, or a heterocyclic ring, and $R_8$ and $R_9$ each independently represent hydrogen, an alkyl group having 1 to 4 carbon atoms substituted with a hydroxyl group, or a phenyl group.

Another aspect of the present application provides a copolymer of a monomer blend including 47 to 73 parts by weight of an alkyl (meth)acrylate containing an alkyl group having 1 to 14 carbon atoms, 20 to 30 parts by weight of a monomer represented by the following Formula 1, and 3 to 27 parts by weight of a monomer represented by the following Formula 2:

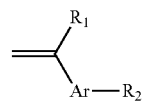

[Formula 1]

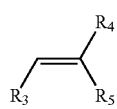

[Formula 2]

In Formulas 1 and 2, $R_1$ and $R_4$ each independently represent hydrogen, or an alkyl group having 1 to 4 carbon atoms, Ar represents a phenyl group, $R_2$ represents hydrogen, or —X—$R_6$, where —X— represents —O—, or —OC(O)—, and $R_6$ represents an alkyl group having 1 to 4 carbon atoms, $R_3$ represents hydrogen, or is joined together with $R_5$ to form a heterocyclic ring, and $R_5$ represents a heterocyclic ring, —COO$R_7$, or —CON$R_8R_9$, where $R_7$ represents hydrogen, an alkyl group having 1 to 4 carbon atoms substituted with a hydroxyl group, or a heterocyclic ring, and $R_8$ and $R_9$ each independently represent hydrogen, an alkyl group having 1 to 4 carbon atoms substituted with a hydroxyl group, or a phenyl group.

Still another aspect of the present application provides a pellet including a core formed of a first resin, and a shell formed of a second resin having a difference in surface energy or melt viscosity from the first resin.

Still another aspect of the present application provides a method of manufacturing a resin-molded article, which includes melting the resin blend to form a melt blend, and processing the melt blend to form a layer separation structure Still another aspect of the present application provides a method of manufacturing a resin-molded article, which includes melting the pellet to form a melt blend, and processing the melt blend to form a layer separation structure.

Yet another aspect of the present application provides a resin-molded article including a first resin layer, a second resin layer formed on the first resin layer, and an interface layer formed between the first resin layer and the second resin layer and including a first resin and a second resin. Here, the second resin is a polymer of a monomer blend including 47 to 73 parts by weight of an alkyl (meth)acrylate containing an alkyl group having 1 to 14 carbon atoms, 20 to 30 parts by weight of a monomer represented by the following Formula 1, and 3 to 27 parts by weight of a monomer represented by the following Formula 2:

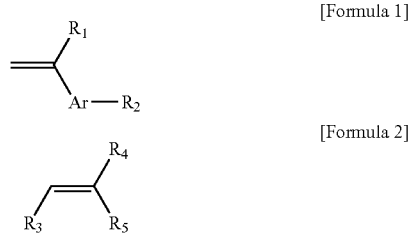

In Formulas 1 and 2, $R_1$ and $R_4$ each independently represent hydrogen, or an alkyl group having 1 to 4 carbon atoms, Ar represents a phenyl group, $R_2$ represents hydrogen, or —X—$R_6$, where —X— represents —O—, or —OC(O)—, and $R_6$ represents an alkyl group having 1 to 4 carbon atoms, $R_3$ represents hydrogen, or is joined together with $R_5$ to form a heterocyclic ring, and $R_5$ represents a heterocyclic ring, —COOR$_7$, or —CONR$_8$R$_9$, where $R_7$ represents hydrogen, an alkyl group having 1 to 4 carbon atoms substituted with a hydroxyl group, or a heterocyclic ring, and $R_8$ and $R_9$ each independently represent hydrogen, an alkyl group having 1 to 4 carbon atoms substituted with a hydroxyl group, or a phenyl group.

Hereinafter, the resin blend, the copolymer, the pellet, the method of manufacturing a resin-molded article using the same, and the resin-molded article according to specific exemplary embodiments of the present application will be described in detail.

As described above, the term "blend" may be a blend of two or more different resins. The type of the blend is not particularly limited, but may include a case in which two or more resins are mixed in one matrix, or a case in which two or more pellets are mixed in one matrix. The respective resins may have different physical properties. For example, the physical properties of the resins may include surface energy, melt viscosity, or solubility parameter.

The term "melt processing" refers to a process of melting a resin blend at a temperature greater than or equal to a melting temperature ($T_m$) to form a melt blend and processing the melt blend to form a desired molded article. For example, the melt processing includes injection molding, extrusion molding, blow molding, transfer molding, film blowing, fiber spinning, calendaring, thermoforming, or expanding molding.

The term "resin-molded article" refers to a pellet or product formed from the resin blend. The resin-molded article is not particularly limited, but may, for example, include automotive parts, parts of electronic equipment, machine parts, functional film, toys or pipes.

The term "layer separation" may mean a case in which a layer formed of substantially one resin is positioned or arranged on a layer formed of substantially another resin. The layer formed of substantially one resin may means that one type of a resin is continuously present over one layer without forming a sea-island structure. The sea-island structure means that a phase-separated resin is partially distributed in the entire resin blend. Also, the term "substantially formed" may mean that one resin is present in one layer, or that one resin is rich in one layer.

According to one exemplary embodiment, the resin blend may be layer-separated by means of melt processing. Therefore, a resin-molded article having a surface showing certain functions, for example, an excellent adhesive strength, may be prepared without using additional processes such as coating, and plating. Therefore, the resin-molded article may have improved adhesive strength and surface characteristics. When the resin blend is used, it is possible to reduce the production cost and time of the resin-molded article.

The layer separation of the resin blend may occur due to a difference in physical properties between a first resin and a second resin, and/or the molecular weight distribution of the second resin. Here, the physical properties may, for example, surface energy, melt viscosity, or solubility parameter. Although this specification discloses the resin blend including two resins, it will be apparent to those skilled in the related art that three resins having different physical properties may be mixed, and layer-separated by means of melt processing.

According to one exemplary embodiment, the resin blend may include a first resin, and a second resin having a difference in surface energy of 0.1 to 35 mN/m at 25° C. from the first resin.

The difference in surface energy between the first resin and the second resin at 25° C. may be in a range of 0.1 to 35 mN/m, 0.1 to 30 mN/m, 0.1 to 20 mN/m, 0.1 to 15 mN/m, 0.1 to 7 mN/m, 1 to 35 mN/m, 1 to 30 mN/m, 2 to 20 mN/m, or 3 to 15 mN/m. When the first and second resins having the difference in surface energy within this range are used, the second resin may migrate to a surface of the resin blend without peeling the first and second resins, thereby promoting a layer separation phenomenon.

The resin blend of the first and second resins having a difference in surface energy of 0.1 to 35 mN/m at 25° C. may be layer-separated by means of melt processing. According to one exemplary embodiment, when the resin blend of the first and second resins is melt-processed and exposed to the air, the first resin and the second resin may be separated due to a difference in hydrophobicity. Particularly, since the second resin having a lower surface energy than the first resin exhibits high hydrophobicity, the second resin may migrate to come in contact with the air, thereby forming a second resin layer disposed toward the air. Also, the first resin may be disposed at a position opposite to that of the air while coming in contact with the second resin. Therefore, layer separation between the first resin and the second resin in the resin blend occurs.

The resin blend may be separated into two or more layers. According to one exemplary embodiment, the resin blend including the first resin and the second resin may be separated into three layers, for example, a second resin layer, a first resin layer and a second resin layer, when two facing surfaces of the melt-processed resin blend are exposed to the air. On the other hand, when only one surface of the melt-processed resin blend is exposed to the air, the resin blend may be separated into two layers, for example, a second resin layer and a first resin layer. Also, when a resin blend including the first resin, the second resin and a third resin, all of which has a difference in surface energy, is melt-processed, the melt-processed resin blend may be separated into five layers, for example, a third resin layer, a second resin layer, a first resin layer, a second resin layer, and a third resin layer. Also, when the entire surface of the melt-processed resin blend is exposed to the air, the resin blend is layer-separated in all directions, thereby forming a core-shell structure.

According to another exemplary embodiment, the resin blend may include a first resin, and a second resin having a difference in melt viscosity of 0.1 to 3,000 Pa*s from the first resin at a shear rate of 100 to 1,000 s$^{-1}$ and a processing temperature of the resin blend.

The difference in melt viscosity between the first resin and the second resin at the shear rate of 100 to 1,000 s$^{-1}$ and the processing temperature of the resin blend may be in a range of 0.1 to 3,000 Pa*s, 1 to 2,000 Pa*s, 1 to 1,000 Pa*s, 1 to 500 Pa*s, 50 to 500 Pa*s, 100 to 500 Pa*s, 200 to 500 Pa*s, or 250 to 500 Pa*s. When the first and second resins having the difference in melt viscosity within this range are used, the second resin may migrate to a surface of the resin blend without peeling the first and second resins, thereby promoting a layer separation phenomenon.

The resin blend of the first and second resins having the difference in melt viscosity of 0.1 to 3,000 Pa*s at the shear rate of 100 to 1,000 s$^{-1}$ and the processing temperature of the resin blend may be layer-separated due to the difference in melt viscosity after melt processing. According to one exemplary embodiment, when the resin blend of the first and second resins is melt-processed and exposed to the air, the first resin and the second resin may be separated due to a difference in fluidity. Particularly, since the second resin having a lower melt viscosity than the first resin exhibits high fluidity, the second resin may migrate to come in contact with the air, thereby forming a second resin layer disposed toward the air. Also, the first resin may be disposed at a position opposite to that of the air while coming in contact with the second resin. Therefore, layer separation between the first resin and the second resin in the resin blend occurs.

The melt viscosity may be measured using capillary flow. In this case, the melt viscosity refers to a shear viscosity (Pa*s) according to a certain processing temperature and a shear rate (/s).

The 'shear rate' refers to a shear rate applied when processing the resin blend. As a result, the shear rate may be adjusted between 100 and 1,000 s$^{-1}$ according to a processing method. The adjustment of the shear rate according to the processing method will be apparent to those skilled in the related art.

The 'processing temperature' refers to a temperature at which the resin blend is processed. For example, when the resin blend is subjected to melt processing such as extrusion or injection, the processing temperature means a temperature applied in the melt processing process. The processing temperature may be adjusted according to the type of resins subjected to the melt processing such as extrusion or injection. For example, a resin blend including a first resin of an acrylonitrile butadiene styrene (ABS) resin and a second resin obtained from an acrylic monomer may have a processing temperature of 210 to 270° C.

According to still another exemplary embodiment of the present application, a resin blend for forming a layer separation structure, which include a first resin, and a second resin having a difference in solubility parameter at 25° C. of 0.001 to 10.0 (J/cm$^3$)$^{1/2}$ from the first resin, may be provided.

The difference in solubility parameter between the first resin and the second resin at 25° C. may be in a range of 0.001 to 10.0 (J/cm$^3$)$^{1/2}$, 0.01 to 5.0 (J/cm$^3$)$^{1/2}$, 0.01 to 3.0 (J/cm$^3$)$^{1/2}$, 0.01 to 2.0 (J/cm$^3$)$^{1/2}$, 0.1 to 1.0 (J/cm$^3$)$^{1/2}$, 0.1 to 10.0 (J/cm$^3$)$^{1/2}$, 3.0 to 10.0 (J/cm$^3$)$^{1/2}$, 5.0 to 10.0 (J/cm$^3$)$^{1/2}$, or 3.0 to 8.0 (J/cm$^3$)$^{1/2}$. Such solubility parameters refer to innate characteristics of a resin exhibiting soluble probability according to polarity of respective resin molecules. In general, the solubility parameters for each resin have been widely known in the related art. When the difference in solubility parameter is less than 0.001 (J/cm$^3$)$^{1/2}$, the first resin is easily miscible with the second resin, which makes it difficult to promote occurrence of a layer separation phenomenon. On the other hand, when the difference in solubility parameter is greater than 10.0 (J/cm$^3$)$^{1/2}$, the first resin may be peeled from the second resin without binding to the second resin.

An upper limit and/or a lower limit of the difference in solubility parameter may be any value(s) ranging from 0.001 to 10.0 (J/cm$^3$)$^{1/2}$, and may depend on the physical properties of the first resin. In particular, when the first resin is used as a base resin, and the second resin is used as a functional resin to improve surface characteristics of the first resin, the second resin may be chosen so that the difference in solubility parameter between the first resin and the second resin at 25° C. is in a range of 0.001 to 10.0 (J/cm$^3$)$^{1/2}$. According to one exemplary embodiment, the difference in solubility parameter may be selected in consideration of miscibility of the second resin in the melt resin blend of the first and second resins.

The resin blend of the first and second resins having the difference in solubility parameter at 25° C. of 0.001 to 10.0 (J/cm$^3$)$^{1/2}$ may be layer-separated after melt processing due to the difference in solubility parameter. According to one exemplary embodiment, when the resin blend of the first and second resins is melt-processed and exposed to the air, the first resin and the second resin may be separated due to the degree of miscibility. Particularly, the second resin having the difference in solubility parameter at 25° C. of 0.001 to 10 (J/cm$^3$)$^{1/2}$ from the first resin may not be miscible with the first resin. Thus, when the second resin also has a lower surface tension or melt viscosity than the first resin, the second resin may migrate to come in contact with the air, thereby forming a second resin layer disposed toward the air. Also, the first resin may be disposed at a position opposite to that of the air while coming in contact with the second resin. Therefore, layer separation between the first resin and the second resin in the resin blend occurs.

In the resin blend, the first resin may be selected as a resin for mainly determining physical properties of a desired molded article, depending on the type of the desired molded article, and processing conditions used. A typical synthetic resin may be used as such a first resin without particular limitation. For example, the first resin may include a styrene-based resin such as an ABS-based resin, a polystyrene-based resin, an acrylonitrile styrene acrylate (ASA)-based resin or a styrene-butadiene-styrene block copolymer-based resin; a polyolefin-based resin such as a high-density polyethylene-based resin, a low-density polyethylene-based resin, or a polypropylene-based resin; a thermoplastic elastomer such as an ester-based thermoplastic elastomer or an olefin-based thermoplastic elastomer; a polyoxyalkylene-based resin such as a polyoxymethylene-based resin or a polyoxyethylene-based resin; a polyester-based resin such as a polyethylene terephthalate-based resin or a polybutylene terephthalate-based resin; a polyvinyl chloride-based resin; a polycarbonate-based resin; a polyphenylene sulfide-based resin; a vinyl alcohol-based resin; a polyamide-based resin; an acrylate-based resin; an engineering plastic; a copolymer or mixture thereof. A plastic having excellent mechanical and thermal properties may be used as the engineering plastic. For example, polyetherketone, polysulfone, and polyimide may be used as the engineering plastic. According to one exemplary embodiment, a copolymer obtained by polymerizing acrylonitrile, butadiene, styrene and an acrylic monomer may be used as the first resin.

According to one exemplary embodiment, the first resin may be a polymer of a monomer blend including an alkyl (meth)acrylate containing an alkyl group having 1 to 14 carbon atoms; a monomer represented by the following Formula 1; and a monomer represented by the following Formula 3.

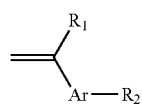
[Formula 1]

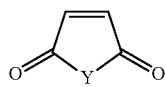
[Formula 3]

In Formulas 1 and 3, $R_1$ represents hydrogen, or an alkyl group having 1 to 4 carbon atoms, Ar represents a phenyl group, $R_2$ represents hydrogen, or —X—$R_6$, where —X— represents —O—, or —OC(O)—, and $R_6$ represents an alkyl group having 1 to 4 carbon atoms, and Y represents oxygen, or $NR_{10}$, where $R_{10}$ represents hydrogen, an alkyl group having 1 to 12 carbon atoms, or a cycloalkyl group having 3 to 8 carbon atoms.

According to one exemplary embodiment, the monomer of Formula 1 may be styrene, or α-methyl styrene, and the monomer of Formula 3 may be cyclohexyl maleimide, or maleic anhydride, but the present application is not limited thereto.

Also, the monomer blend forming the polymer of the first resin may include 85 to 98 parts by weight of the alkyl (meth)acrylate containing an alkyl group having 1 to 14 carbon atoms, 1 to 5 parts by weight of the monomer of Formula 1, and 3 to 10 parts by weight of the monomer of Formula 3. When the alkyl (meth)acrylate containing an alkyl group having 1 to 14 carbon atoms is included at a content of less than 85 parts by weight, compatibility with a second resin to be described later may be excessively degraded, resulting in a peeling phenomenon on surfaces of the first resin and the second resin.

In the resin blend, a resin capable of exhibiting the above-described physical properties in relation with the first resin and giving proper compatibility with the first resin and excellent affinity to an adhesive may be used as the second resin.

According to one exemplary embodiment, the second resin may be a polymer of a monomer blend including:

47 to 73 parts by weight of an alkyl (meth)acrylate containing an alkyl group having 1 to 14 carbon atoms;

20 to 30 parts by weight of a monomer represented by the following Formula 1; and 3 to 27 parts by weight of a monomer represented by the following Formula 2.

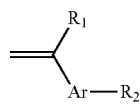
[Formula 1]

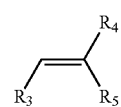
[Formula 2]

In Formulas 1 and 2, $R_1$ and $R_4$ each independently represent hydrogen, or an alkyl group having 1 to 4 carbon atoms, Ar represents a phenyl group, $R_2$ represents hydrogen, or —X—$R_6$, where —X— represents —O—, or —OC(O)—, and $R_6$ represents an alkyl group having 1 to 4 carbon atoms, $R_3$ represents hydrogen, or is joined together with $R_5$ to form a heterocyclic ring, and $R_5$ represents a heterocyclic ring, —$COOR_7$, or —$CONR_8R_9$, where $R_7$ represents hydrogen, an alkyl group having 1 to 4 carbon atoms substituted with a hydroxyl group, or a heterocyclic ring, and $R_8$ and $R_9$ each independently represent hydrogen, an alkyl group having 1 to 4 carbon atoms substituted with a hydroxyl group, or a phenyl group.

Also, in Formulas 1 and 2, for example, $R_1$ and $R_4$ each independently represent hydrogen, or a methyl group, Ar represents a phenyl group, $R_2$ represents hydrogen, or —X—$R_6$, where —X— represents —O—, or —OC(O)—, and $R_6$ represents a methyl group, or an ethyl group, $R_3$ represents hydrogen, or is joined together with $R_5$ to form a maleic anhydride, or a maleimide unsubstituted or substituted with an alkyl group having 1 to 12 carbon atoms, or a cycloalkyl group having 3 to 8 carbon atoms, and $R_5$ represents a pyrrolidone, phthalimide, or succinimidyl group, —$COOR_7$, or —$CONR_8R_9$, where $R_7$ represents hydrogen, a methyl group substituted with a hydroxyl group, a lactone group, or a succinimidyl group, and $R_8$ and $R_9$ each independently represent hydrogen, a methyl group substituted with a hydroxyl group, or a phenyl group.

The compatibility between the first resin and the second resin functions as a layer separation inducer. In this case, when the compatibility is very good, layer separation efficiency between the first resin and the second resin is degraded. On the other hand, when the compatibility is very poor, the first resin may be peeled off from a surface of the second resin, or large domains may be formed in a molded article. Therefore, proper compatibility between the first resin and the second resin is required for effective layer separation. Accordingly, when the second resin according to one exemplary embodiment of the present application may include a proper content of a certain monomer in consideration of the compatibility with the first resin, it is possible to achieve the above-described effects.

According to one exemplary embodiment, when the monomer blend of the second resin includes the alkyl (meth)acrylate containing an alkyl group having 1 to 14 carbon atoms at a content of 47 to 73 parts by weight, for example, 50 to 70 parts by weight, or 55 to 65 parts by weight, excellent compatibility with the first resin may be exhibited. For example, the alkyl (meth)acrylate monomer containing an alkyl group having 1 to 14 carbon atoms is a component included in the monomer blend of the first resin, that is, a component used to ensure compatibility between the first resin and the second resin.

The compound of Formula 1 is a component used to promote layer separation effectively, and thus is included in the monomer blend of the second resin. For example, the compound of Formula 1 is a component showing poor compatibility with the compound of Formula 3 included in the monomer blend of the first resin, and thus may be included in the monomer blend of the second resin. The compound of Formula 1 may be included at a content of 20 to 30 parts by weight, for example, 22 to 28 parts by weight, or 24 to 26 parts by weight, in the monomer blend of the second resin. In this case, when the content of the compound of Formula 1 is greater than 30 parts by weight, compatibility with the first resin may be excessively degraded, resulting in a peeling phenomenon on surfaces of the first resin and the second resin.

Further, the compound of Formula 2 is a component used to enhance affinity to an adhesive, for example, a polyvinyl alcohol-based adhesive, a radical polymerizable adhesive polymerized from a hydroxyl group-containing acrylate, an epoxy-based acrylate, an urethane-based acrylate, an oxetane-based acrylate, a polyester-based acrylate, or a silicone-based acrylate, or a cationic polymerizable adhesive derived from an oligomer such as an epoxy resin, or a vinyl ester resin, and thus may, for example, be a monomer containing a heterocyclic ring moiety, or a hydrophilic group. For example, the monomer of Formula 2 may include a maleic anhydride, γ-butyrolactone (meth)acrylate, N-vinyl pyrrolidone, N-vinyl phthalimide, N-succinimidyl acrylate, norbonene lactone (meth)acrylate, (meth)acrylic acid, hydroxyethyl (meth)acrylate, acrylamide, N-methylol acrylamide, or N-phenyl acrylamide, but the present application is not limited thereto.

According to one exemplary embodiment of the present application, γ-butyrolactone (meth)acrylate may be used as the compound of Formula 2, or may be used together with γ-butyrolactone (meth)acrylate and hydroxyethyl (meth)acrylate.

The compound of Formula 2 may be included at a content of 3 to 27 parts by weight, for example, 5 to 25 parts by weight, or 10 to 20 parts by weight, in the monomer blend of the second resin. In this case, when the compound of Formula 2 is included at a content of less than 3 parts by weight, it is difficult to ensure sufficient adhesive strength to the adhesive. On the other hand, when the content of the compound of Formula 2 is greater than 27 parts by weight, the contents of the alkyl (meth)acrylate and the monomer of Formula 1 may be relatively lowered, and thus a peeling phenomenon on surfaces of the first resin and the second resin may occur or layer separation may not occur due to excessively low compatibility with the first resin.

When the resin-molded article formed of the resin blend is used as a protective film for polarizing plates, the resin-molded article may replace a TAC-based film, or an acrylic protective film which has been used in the related art. Particularly, in the case of a conventional acrylic protective film, a surface of the acrylic protective film should be coated with a primer using an additional coating process in order to ensure an adhesive property to a polarizer. However, the resin blend according to one exemplary embodiment of the present application, and the protective film prepared therefrom may exhibit excellent adhesive strength to the polarizer without performing an additional primer coating process on a surface of the protective film for polarizing plates, thereby reducing production time and cost and enhancing productivity.

According to one exemplary embodiment, the second resin may have a weight-average molecular weight (Mw) of approximately 5,000 to 200,000. According to another exemplary embodiment, the weight-average molecular weight of the second resin may also be controlled to a range of approximately 10,000 to 200,000, 15,000 to 200,000, 20,000 to 200,000, 5,000 to 180,000, 5,000 to 150,000, 5,000 to 120,000, 10,000 to 180,000, 15,000 to 150,000, or 20,000 to 120,000. For example, when the second resin having a weight-average molecular weight within this range is applied to a resin blend for melt processing, the second resin may exhibit proper fluidity, thereby causing layer separation easily.

Also, according to one exemplary embodiment, a molecular weight distribution (i.e., a polydispersity index (PDI)) of the second resin may be controlled to a range of 1 to 2.5, 1 to 2.2, 1.5 to 2.5, or 1.5 to 2.2. For example, when the second resin having a molecular weight distribution within this range is applied to a resin blend for melt processing, the contents of an oligomer and/or a polymer which serve to interfere with occurrence of layer separation in the second resin may decrease, thereby causing layer separation more easily.

According to one exemplary embodiment, the resin blend may include the second resin at 0.1 to 50 parts by weight, based on 100 parts by weight of the first resin. Also, according to another exemplary embodiment, the resin blend may include the second resin at 1 to 30 parts by weight, 1 to 20 parts by weight, or 1 to 15 parts by weight, based on 100 parts by weight of the first resin. When the first resin and the second resin are included within these content ranges, a layer separation phenomenon may be induced, and an economical resin blend may be provided since the content of the relatively expensive second resin is properly controlled compared to the content of the first resin.

A still another aspect of the present application provides a copolymer of a monomer blend including:

47 to 73 parts by weight of an alkyl (meth)acrylate containing an alkyl group having an alkyl group having 1 to 14 carbon atoms;

20 to 30 parts by weight of a monomer represented by the following Formula 1; and 3 to 27 parts by weight of a monomer represented by the following Formula 3.

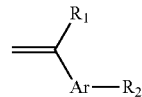

[Formula 1]

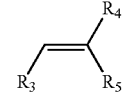

[Formula 2]

In Formulas 1 and 2, $R_1$ and $R_4$ each independently represent hydrogen, or an alkyl group having 1 to 4 carbon atoms, Ar represents a phenyl group, $R_2$ represents hydrogen, or —X—$R_6$, where —X— represents —O—, or —OC(O)—, and $R_6$ represents an alkyl group having 1 to 4 carbon atoms, $R_3$ represents hydrogen, or is joined together with $R_5$ to form a heterocyclic ring, and $R_5$ represents a heterocyclic ring, —COOR$_7$, or —CONR$_8$R$_9$, where $R_7$ represents hydrogen, an alkyl group having 1 to 4 carbon atoms substituted with a hydroxyl group, or a heterocyclic ring, and $R_8$ and $R_9$ each independently represent hydrogen, an alkyl group having 1 to 4 carbon atoms substituted with a hydroxyl group, or a phenyl group.

The types and physical properties of the first and second resins are already described above, and thus a specific description thereof is omitted for clarity.

The above-described resin blend may be prepared into a pellet by means of extrusion. The pellet prepared using the resin blend may have a core formed of the first resin, and a shell formed by layer separation of the second resin from the first resin.

According to one exemplary embodiment, the pellet includes a core formed of the first resin, and a shell formed of the second resin that is a polymer of a monomer blend which has a difference in surface energy, melt viscosity or solubility parameter from the first resin, and includes 47 to 73 parts by weight of the alkyl (meth)acrylate containing an alkyl group having 1 to 14 carbon atoms, 20 to 30 parts by weight of the monomer of Formula 1, and 3 to 27 parts by weight of the monomer of Formula 2.

As described above, the first resin and the second resin may also have different surface energies, melt viscosities, or solubility parameters. For example, the first resin and the second resin may have a difference in surface energy at 25° C. of 0.1 to 35 mN/m; or a difference in melt viscosity of 0.1 to 3,000 Pa*s at a shear rate of 100 to 1,000 $s^{-1}$ and a processing temperature of the pellet.

The types and physical properties of the first and second resins are already described above, and thus a specific description thereof is omitted for clarity.

Meanwhile, the above-described resin blend or pellet may be melt-processed to provide a resin-molded article having a layer separation structure.

According to one exemplary embodiment, a method of manufacturing a resin-molded article, which includes melting a resin blend to form a melt blend, and processing the melt blend to form a layer separation structure, is provided.

As described above, a layer separation phenomenon may occur due to the difference in physical properties between the first resin and the second resin during a process of melt-processing the resin blend. Owing to such a layer separation phenomenon, an effect of selectively coating a surface of the pellet or the molded article may be exhibited without performing any additional process.

Particularly, when the polymer of the monomer blend, which includes 47 to 73 parts by weight of the alkyl (meth)acrylate containing an alkyl group having 1 to 14 carbon atoms, 20 to 30 parts by weight of the monomer of Formula 1, and 3 to 27 parts by weight of the monomer of Formula 2, is used as the second resin, a shell region having a relatively low surface energy or melt viscosity is positioned on a surface of the resin-molded article during a melt processing process, and thus the resin-molded article having improved mechanical and surface characteristics may be provided.

The melt processing of the resin blend may be performed under a shear stress. For example, the melt processing of the resin blend may be performed using an extrusion and/or injection processing method(s).

Also, the temperature may vary according to the types of the first and second resins used in the melt processing of the resin blend. For example, when a styrene-based resin is used as the first resin and an acrylic resin is used as the second resin, the melt processing temperature may be controlled to approximately 210 to 270° C.

The method of manufacturing a resin-molded article may further include curing the melt blend obtained by melt processing the resin blend, that is, a melt-processed product of the resin blend. The curing may, for example, be heat during, or UV curing. Also, the resin-molded article may be further subjected to chemical or physical treatment.

According to one exemplary embodiment, the method of manufacturing a resin-molded article may further include preparing a second resin before the melting of the resin blend to form the melt blend. The second resin may provide certain functions, for example, an excellent adhesive property, to a surface layer of the resin-molded article. The contents regarding the preparation of the second resin are already described above, and thus a specific description thereof is omitted for clarity.

According to another exemplary embodiment, a method of manufacturing a resin-molded article may include melting a pellet to form a melt blend, and processing the melt blend to form a layer separation structure.

According to one exemplary embodiment, the pellet may be prepared by subjecting the above-described resin blend to melt processing such as extrusion. For example, when the resin blend including the first resin and the second resin is extruded, the second resin having higher hydrophobicity than the first resin may migrate to come in contact with the air, thereby forming a surface layer (shell) of the pellet. The first resin may be disposed in a central region of the pellet to form a core. The pellet prepared thus may be prepared into a resin-molded article by means of melt processing such as injection, but the present application is not limited thereto. According to another exemplary embodiment, the resin blend may be directly prepared into a resin-molded article by means of melt processing such as injection.

Meanwhile, according to another exemplary embodiment, the resin-molded article may include a first resin layer, a second resin layer formed on the first resin layer, and an interface layer formed between the first resin layer and the second resin layer. The interface layer may include the first and second resins.

The resin-molded article prepared from a resin blend, which includes the certain first resin and the second resin having a difference in physical properties from the first resin, may, for example, have a layer separation structure in which a first resin layer is positioned inside the resin-molded article and a second resin layer is formed on a surface of the resin-molded article.

Particularly, when the above-described resin is used as the second resin, adhesive strength of the molded article may be further improved.

The 'first resin layer' may mainly include the first resin, determine physical properties of the molded article, and be positioned inside the resin-molded article. Also, the 'second resin layer' may mainly include the second resin, and be positioned at an outer portion of the resin-molded article to provide certain functions to a surface of the molded article.

The specific contents of the first and second resins are already described above, and thus a description thereof is omitted for clarity.

The resin-molded article may include an interface layer formed between the first resin layer and the second resin layer and including a miscible blend of the first and second resins. The interface layer may be formed between the layer-separated first and second resin layers to function as a boundary surface, and may include the miscible blend of the first and second resins. The miscible blend may be present in a state in which the first resin is physically or chemically bound to the second resin. In this case, the first resin layer and the second resin layer may be bound by means of such a miscible blend.

The resin-molded article may be formed in a structure in which the first resin layer and the second resin layer are divided by such an interface layer and the second resin layer is exposed to external environments. For example, the molded article may have a structure in which the first resin layer, the interface layer, and the second resin layer are sequentially stacked, or a structure in which the interface layer and the second resin layer are stacked on the top and bottom surfaces of the first resin layer. Also, the resin-molded article may have a structure in which the interface layer and the second resin layer sequentially surround the first resin layer having various 3D shapes, for example spherical, circular, polyhedral, and sheet-type shapes.

The layer separation phenomenon observed in the resin-molded article seems to occur when the resin-molded article is prepared using the certain first and second resins having different physical properties. Examples of such different physical properties may include surface energy, or melt viscosity. The specific contents regarding such a difference in physical properties are as described above.

According to one exemplary embodiment, the first resin layer, the interface layer and the second resin layer may be confirmed using a scanning electron microscope (SEM) by subjecting a test sample to a low-temperature impact test, followed by etching a fracture surface of the test sample with tetrahydrofuran (THF) vapor. To measure the thickness of each layer, a test sample is cut using a diamond blade of microtoming equipment, a cut section is made smooth, and the smooth section is etched with a solution in which the second resin may be relatively more easily dissolved than the first resin. The smooth section portion may be etched to different extents according to the contents of the first resin and the second resin, and the first resin layer, the second resin layer, the interfacial layer and a surface of the test sample may be observed due to a shade difference, as viewed from a surface of the test sample at an angle of 45° using an SEM. As a result, the thickness of each layer may be measured. According to one exemplary embodiment, a 1,2-dichloroethane solution (10% by volume in EtOH) is used as the solution in which the second resin is selectively dissolved more easily, but this is given for the purpose of illustration only. Therefore, solutions in which the second resin has higher solubility than the first resin are not particularly limited, and may be properly selected and applied according to the kind and compositions of the second resin by those skilled in the related art.

The interface layer may have a thickness of 1 to 95%, 10 to 95%, 20 to 95%, 30 to 95%, 40 to 95%, 50 to 95%, 60 to 95%, or 60 to 90%, based on the sum of thicknesses of the second resin layer and the interfacial layer. When the interfacial layer has a thickness of 0.01 to 95% based on the sum of thicknesses of the second resin layer and the interfacial layer, a peeling phenomenon between the first resin layer and the second resin layer does not take place due to excellent interfacial bond strength between the first resin layer and the second resin layer, and surface characteristics by the second resin layer may be drastically improved. On the other hand, when the interfacial layer is much thinner than the second resin layer, a peeling phenomenon between the first resin layer and the second resin layer may take place due to low bond strength between the first resin layer and the second resin layer, whereas the surface characteristics by the second resin layer may be slightly improved when the interfacial layer is much thicker than the second resin layer.

The second resin layer may have a thickness of 0.01 to 30%, 0.01 to 20%, 0.01 to 10%, 0.01 to 5%, 0.01 to 3%, 0.01 to 1%, or 0.01 to 0.1%, based on the total thickness of the resin-molded article. When the second resin layer has a thickness within this range, an improved adhesive property may be provided to a surface of the molded article. In this case, when the second resin layer has a very small thickness, it may be difficult to sufficiently improve an adhesive property of the molded article. On the other hand, when the second resin layer has a very high thickness, mechanical properties of a functional resin itself may be reflected in the resin-molded article to alter mechanical properties of the first resin.

In the resin-molded article having the above-described structure, components of the first resin layer on a surface of the second resin layer are detected by means of an infrared spectrometer (IRS).

As described above, the surface of the second resin layer refers to a surface which does not face the first resin layer but is exposed to external environments (for example, air).

The specific contents regarding the first resin, the second resin and the difference in physical properties between the first resin and the second resin are already described above, and thus a description thereof is omitted for clarity. Also, in this specification, the difference in physical properties between the first resin and the second resin refers to a difference in physical properties between the first resin and the second resin, or a difference in physical properties between the first resin layer and the second resin layer.

According to one exemplary embodiment, the resin-molded article may be used to provide a protective film for polarizing plates. For example, the resin-molded article may be used instead of a TAC-based protective film which has been used in the related art. In this case, the polarizing plates may be provided in a state in which the second resin layer(s) of the resin-molded article is attached to one or both surfaces of a polarizer. The type of the polarizer is not particularly limited. For example, a film prepared by including a polarizing component such as iodine or a dichroic dye in a film made of a polyvinyl alcohol-based resin and elongating the polarizing component-containing film may be used as the polarizer. A hydrolysate of polyvinyl alcohol, polyvinyl formal, polyvinyl acetal, or an ethylene-acetic acid vinyl copolymer may be used as the polyvinyl alcohol-based resin. In this case, the polyvinyl alcohol-based resin may have a degree of polymerization of 100 to 5,000, preferably 1,400 to 4,000. Also, the thickness of the polarizer may be properly selected according to the use of a liquid crystal display device, etc. In general, the polarizer may be formed to have a thickness of 5 μm to 80 μm, but the present application is not limited thereto. A method of attaching a protective film for polarizing plates prepared using the resin-molded article according to one exemplary embodiment of the present application to the polarizer is not particularly limited. For example, the polarizer may be attached to the second resin layer of the resin-molded article using a known adhesive means such as a polyvinyl alcohol-based adhesive or UV-curable adhesive including a polyvinyl alcohol-based resin and a cross-linking agent, for example, a radical polymerizable adhesive polymerized from a hydroxyl group-containing acrylate, an epoxy-based acrylate, an urethane-based acrylate, an oxetane-based acrylate, a polyester-based acrylate, or a silicone-based acrylate, or a cationic polymerizable adhesive derived from an oligomer such as an epoxy resin, or a vinyl ester resin. When the resin-molded article formed of the resin blend is used as the protective film for polarizing plates, the resin-molded article may replace a TAC-based film, or an acrylic protective film which has been used in the related art. Particularly, in the case of a conventional acrylic protective film, a surface of the acrylic protective film should be coated with a primer using an additional coating process in order to ensure an adhesive property to a polarizer. However, the resin blend according to one exemplary embodiment of the present application, and the protective film prepared therefrom may exhibit excellent affinity to the adhesive since the second resin included in the second resin layer includes the above-described compound of Formula 2. Also, the second resin layer may be formed by layer separation during a melt processing process, thereby omitting an additional primer coating process on a surface of the protective film for polarizing plates. Further, the second resin layer may exhibit excellent adhesive strength to the polarizer, thereby reducing production time and cost and enhancing productivity.

Advantageous Effects

The resin blend according to one exemplary embodiment of the present application can be useful in providing a protective film for polarizing plates having excellent adhesive strength to a polarizer. Also, the resin blend can be useful in exhibiting excellent adhesive strength to the polarizer without performing an additional primer coating process on a surface(s) of the protective film for polarizing plate, thereby reducing production time and cost and improving productivity.

DESCRIPTION OF DRAWINGS

FIG. 1 shows an SEM image of a layer-separated cross-sectional shape of a resin-molded article prepared in Example 4.

FIG. 2 shows an SEM image of a layer-separated cross-sectional shape of a resin-molded article prepared in Comparative Example 1.

BEST MODE

Hereinafter, the resin blend will be described in further detail with reference to Examples and Comparative Examples. However, it should be understood that the resin blend according to one exemplary embodiment of the resent invention is not limited to the Examples disclosed below.

Elongation films prepared in the following Examples and Comparative Examples were evaluated for physical properties, as follows.

1. Measurement of Optical Properties (Haze and Transmittance)

Elongation films were measured for haze and transmittance using a haze meter HM-150 (commercially available from Murakami Color Research Laboratory).

2. Measurement of Melt Viscosity

The elongation films were measured for melt viscosity using a capillary rheometer (Capillary Rheometer 1501 commercially available from Gottfert).

Specifically, a capillary die was attached to a barrel, and a resin obtained in Examples or Comparative Examples was put into the barrel three times. Thereafter, the shear viscosity (Pa*s) of the resin according to a shear rate at a processing temperature of 250° C. was measured.

3. Measurement of Adhesive Strength

To evaluate an adhesive strength between a polarizer and a protective film in a polarizing plate, a polarizing plate having a width of 18 mm was prepared. Specifically, a polarizing plate was prepared by attaching each of test samples prepared as protective films in Examples and Comparative Examples to a surface of a polarizer, which was prepared by elongating a polyvinyl alcohol-based resin film, staining the resin film with iodine and treating the stained resin film with an aqueous boric acid solution, so that each of the test sample faced toward the polarizer. The prepared polarizing plates were measured for 90° peel strength at a peel rate of 300 mm/min using a Texture analyzer (commercially available from MHK Trading Co.). The peel strength was measured in triplicate, and an average value was recorded.

4. Section Observation

The test samples prepared in Examples and Comparative Examples were subjected to a low-temperature impact test, and fracture surfaces of the test samples were etched with THF vapor. Thereafter, layer-separated cross-cross-sectional shapes of the test samples were observed using an SEM (commercially available from Hitachi Chemical Co., Model name: S-4800).

The observed cross-cross-sectional shapes were evaluated according to the following evaluation criteria.

○: Complete layer separation is observed
Δ: Layer separation is insufficient
x: Layer separation is not observed 5. Measurement of Surface Energy Test samples were measured for surface energy using a drop shape analyzer (Trade name: DSA100 commercially available from KRUSS GmbH) according to an Owens-Wendt-Rabel-Kaelble method.

Specifically, 15% by weight of each of the resins obtained in Examples or Comparative Examples was dissolved in a methyl ethyl ketone solvent, and an LCD glass was then bar-coated with the resulting resin solution. Thereafter, the coated LCD glass was pre-dried at 60° C. for 2 minutes in an oven, and dried at 90° C. for one minute in the oven.

After the drying (or curing), each of deionized water and diiodomethane was dropped 10 times on the coated surface, and an average value of contact angles was calculated, and then applied to the Owens-Wendt-Rabel-Kaelble method to calculate surface energy.

Preparative Example: Preparation of Second Resins

Preparative Example 1

1,144 g of a solvent, methyl ethyl ketone, and 520 g of methyl methacrylate (MMA), 200 g of styrene and 80 g of γ-butyrolactone methacrylate (GBLMA) as monomers, and 0.4 g of a chain transfer agent, n-dodecyl mercabtane (n-DDM), were put into a reactor, and a nitrogen atmosphere was formed. Thereafter, 1.6 g of an initiator, azobisisobutyronitrile (AIBN), was added into the reactor, and the resulting blend was stirred at a rate of 400 rpm. Polymerization was performed at a reaction temperature of 70° C. for 18 hours, and the resulting polymerization product was precipitated in normal hexane, repeatedly washed and dehydrated three times, and dried at 80° C. in an oven.

Preparative Example 2

A second resin was prepared in the same manner as in Preparative Example 1, except that 440 g of methyl methacrylate, 200 g of styrene, and 160 g of γ-butyrolactone methacrylate were used as the monomers.

Preparative Example 3

A second resin was prepared in the same manner as in Preparative Example 1, except that 560 g of methyl methacrylate, 200 g of styrene, and 40 g of 2-hydroxyethyl methacrylate (2-HEMA) were used as the monomers.

Preparative Example 4

A second resin was prepared in the same manner as in Preparative Example 1, except that 400 g of methyl methacrylate, 200 g of styrene, 160 g of γ-butyrolactone methacrylate, and 40 g of 2-HEMA were used as the monomers.

Preparative Example 5

A second resin was prepared in the same manner as in Preparative Example 1, except that 520 g of methyl methacrylate, 200 g of styrene, and 80 g of N-vinyl pyrrolidone were used as the monomers.

Preparative Example 6

A second resin was prepared in the same manner as in Preparative Example 1, except that 400 g of methyl methacrylate, 200 g of styrene, 160 g of γ-butyrolactone methacrylate, and 40 g of N-vinyl pyrrolidone were used as the monomers.

Preparative Example 7

A second resin was prepared in the same manner as in Preparative Example 1, except that 600 g of methyl methacrylate, and 200 g of styrene were used as the monomers.

Preparative Example 8

A second resin was prepared in the same manner as in Preparative Example 1, except that 280 g of methyl methacrylate, 200 g of styrene, and 320 g of γ-butyrolactone methacrylate were used as the monomers.

Preparative Example 9

A second resin was prepared in the same manner as in Preparative Example 1, except that 360 g of methyl methacrylate, 200 g of styrene, 160 g of γ-butyrolactone methacrylate, and 80 g of 2-HEMA were used as the monomers.

Preparative Example 10

A second resin was prepared in the same manner as in Preparative Example 1, except that 360 g of methyl methacrylate, 200 g of styrene, 160 g of γ-butyrolactone methacrylate, and 80 g of N-vinyl pyrrolidone were used as the monomers.

Example 1

90 parts by weight of a first resin (a thermoplastic resin including methyl methacrylate at 91 parts by weight, cyclohexyl maleimide at 6 parts by weight, and α-methyl styrene at 3 parts by weight) was mixed with 10 parts by weight of the second resin prepared in Preparative Example 1, and the resulting mixture was extruded at a temperature of 250° C. in a twin-screw extruder (commercially available from Leistritz Corp.) to obtain a pellet. Thereafter, such a pellet was extruded at a temperature of 250° C. in an extruder having a T-die gap of 1 t (commercially available from EM Industries, Inc.) to prepare an extrusion film having a film thickness of approximately 180 to 210 μm. The extrusion film was biaxially elongated in machine (MD) and traverse (TD) directions at a temperature of 135° C. to prepare an elongation film having a thickness of approximately 50 μm.

Example 2

A test sample was prepared in the same manner as in Example 1, except that 10 parts by weight of the second resin obtained in Preparative Example 2 was mixed with 90 parts by weight of the same first resin as used in Example 1.

Example 3

A test sample was prepared in the same manner as in Example 1, except that 10 parts by weight of the second resin obtained in Preparative Example 3 was mixed with 90 parts by weight of the same first resin as used in Example 1.

Example 4

A test sample was prepared in the same manner as in Example 1, except that 10 parts by weight of the second resin obtained in Preparative Example 4 was mixed with 90 parts by weight of the same first resin as used in Example 1.

Example 5

A test sample was prepared in the same manner as in Example 1, except that 10 parts by weight of the second resin obtained in Preparative Example 5 was mixed with 90 parts by weight of the same first resin as used in Example 1.

Example 6

A test sample was prepared in the same manner as in Example 1, except that 10 parts by weight of the second resin obtained in Preparative Example 6 was mixed with 90 parts by weight of the same first resin as used in Example 1.

Comparative Example 1

100 parts by weight of a pellet of the first resin used in Example 1 was dried in an oven, and the pellet was extruded in the same manner as in Example 1 to prepare an extrusion film. The extrusion film was elongated in the same manner as in Example 1 to prepare an elongation film.

Comparative Example 2

A test sample was prepared in the same manner as in Example 1, except that 10 parts by weight of the second resin obtained in Preparative Example 7 was mixed with 90 parts by weight of the same first resin as used in Example 1.

Comparative Example 3

A test sample was prepared in the same manner as in Example 1, except that 10 parts by weight of the second resin obtained in Preparative Example 8 was mixed with 90 parts by weight of the same first resin as used in Example 1.

Comparative Example 4

A test sample was prepared in the same manner as in Example 1, except that 10 parts by weight of the second resin obtained in Preparative Example 9 was mixed with 90 parts by weight of the same first resin as used in Example 1.

Comparative Example 5

A test sample was prepared in the same manner as in Example 1, except that 10 parts by weight of the second resin obtained in Preparative Example 10 was mixed with 90 parts by weight of the same first resin as used in Example 1.

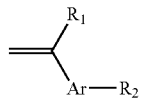

[Formula 1]

[Formula 3]

wherein $R_1$ represents hydrogen, or an alkyl group having 1 to 4 carbon atoms, Ar represents a phenyl group,

TABLE 1

| | Difference in surface energy (mN/m) | Optical properties Haze | Optical properties T (%) | Adhesive strength (N/cm²) | Phase separation | Difference in melt viscosity (Pa*s) |
|---|---|---|---|---|---|---|
| Example 1 | 6 | 0.2 | 93.8 | 2.8 | o | 1,120 |
| Example 2 | 5 | 0.2 | 93.7 | 3 | o | 1,210 |
| Example 3 | 5 | 0.2 | 93.9 | 2.6 | o | 1,075 |
| Example 4 | 7 | 0.2 | 93.7 | 3.5 | o | 1,200 |
| Example 5 | 5 | 0.2 | 93.8 | 2.5 | o | 1,205 |
| Example 6 | 6 | 0.2 | 93.7 | 3.4 | o | 1,200 |
| Comparative Example 1 | — | 0.3 | 93.7 | 2 | x | — |
| Comparative Example 2 | 5 | 0.3 | 93.8 | 2.5 | o | 1,010 |
| Comparative Example 3 | 6 | (unelongatable) | (unelongatable) | (unelongatable) | o | 1,250 |
| Comparative Example 4 | 7 | (unelongatable) | (unelongatable) | (unelongatable) | o | 1,205 |
| Comparative Example 5 | 5 | (unelongatable) | (unelongatable) | (unelongatable) | o | 1,195 |

The invention claimed is:

1. A resin blend comprising:

a first resin; and a second resin that is an acrylic polymer having a difference in surface energy, melt viscosity or solubility parameter from the first resin, wherein the first resin is a polymer of a monomer blend comprising: an alkyl (meth)acrylate containing an alkyl group having 1 to 14 carbon atoms; a monomer represented by Formula 1; and a monomer represented by Formula 3, wherein the second resin is a polymer of a monomer blend comprising: 47 to 73 parts by weight of an alkyl (meth)acrylate containing an alkyl group having 1 to 14 carbon atoms; 20 to 30 parts by weight of a monomer represented by Formula 1; and 3 to 27 parts by weight of a monomer at least one selected from the group consisting of γ-butyrolactone (meth)acrylate, N-vinyl pyrrolidone, N-vinyl phthalimide, N-succinimidyl acrylate, norbonene lactone (meth)acrylate, hydroxyethyl (meth)acrylate, N-methylol acrylamide and N-phenyl acrylamide, wherein the second resin has a difference in surface energy of 0.1 to 35 mN/m at 25° C. from the first resin, and wherein the second resin has a difference in melt viscosity of 0.1 to 3,000 Pa*s from the first resin at a shear rate of 100 to 1,000 s$^{-1}$ and a processing temperature of the resin blend:

$R_2$ represents hydrogen, or —X—$R_6$, where —X— represents —O—, or —OC(O)—, and $R_6$ represents an alkyl group having 1 to 4 carbon atoms, Y represents oxygen, or $NR_{10}$, where $R_{10}$ represents hydrogen, an alkyl group having 1 to 12 carbon atoms, or a cycloalkyl group having 3 to 8 carbon atoms.

2. The resin blend of claim 1, wherein the second resin has a difference in solubility parameter at 25° C. of 0.001 to 10.0 (J/cm³)$^{1/2}$ from the first resin.

3. The resin blend of claim 1, wherein the monomer blend for the first resin comprises:

85 to 98 parts by weight of the alkyl (meth)acrylate containing an alkyl group having 1 to 14 carbon atoms;

1 to 5 parts by weight of the monomer represented by Formula 1; and 3 to 10 parts by weight of the monomer represented by Formula 3.

4. The resin blend of claim 1, wherein the monomer of Formula 1 is styrene or α-methyl styrene, and the monomer of Formula 3 is a cyclohexyl maleimide or a maleic anhydride.

5. The resin blend of claim 1, wherein $R_1$ represents hydrogen, or a methyl group, Ar represents a phenyl group, $R_2$ represents hydrogen, or —X—$R_6$, where —X— represents —O—, or —OC(O)—, and $R_6$ represents a methyl group, or an ethyl group.

6. The resin blend of claim 1, wherein the second resin has a molecular weight distribution of 1 to 2.5.

7. The resin blend of claim 1, wherein the second resin has a weight-average molecular weight of 5,000 to 200,000.

8. The resin blend of claim 1, wherein the second resin is included at a content of 0.1 to 50 parts by weight, based on 100 parts by weight of the first resin.

* * * * *